United States Patent
Mack et al.

(10) Patent No.: US 9,746,626 B2
(45) Date of Patent: Aug. 29, 2017

(54) METHOD AND SYSTEM FOR OPTICAL POWER MONITORING OF A LIGHT SOURCE ASSEMBLY COUPLED TO A SILICON PHOTONICALLY-ENABLED INTEGRATED CIRCUIT

(71) Applicant: Luxtera, Inc., Carlsbad, CA (US)

(72) Inventors: Michael Mack, San Diego, CA (US); Subal Sahni, La Jolla, CA (US); Steffen Gloeckner, San Diego, CA (US)

(73) Assignee: Luxtera, Inc., Carlsbad, CA (US)

(*) Notice: Subject to any disclaimer, the term of this patent is extended or adjusted under 35 U.S.C. 154(b) by 0 days.

(21) Appl. No.: 15/205,400

(22) Filed: Jul. 8, 2016

(65) Prior Publication Data
US 2016/0320576 A1 Nov. 3, 2016

Related U.S. Application Data

(63) Continuation of application No. 14/612,416, filed on Feb. 3, 2015, now Pat. No. 9,389,378.

(60) Provisional application No. 61/965,612, filed on Feb. 3, 2014.

(51) Int. Cl.
| | |
|---|---|
| *G02B 6/42* | (2006.01) |
| *G02B 6/32* | (2006.01) |
| *G02B 6/34* | (2006.01) |
| *H04B 10/079* | (2013.01) |
| *H04B 10/25* | (2013.01) |

(52) U.S. Cl.
CPC .............. *G02B 6/4286* (2013.01); *G02B 6/32* (2013.01); *G02B 6/34* (2013.01); *G02B 6/4206* (2013.01); *G02B 6/4214* (2013.01); *H04B 10/07955* (2013.01); *H04B 10/25* (2013.01)

(58) Field of Classification Search
CPC .......... G02B 6/4286; G02B 6/32; G02B 6/34; G02B 6/4206; G02B 6/4214; H04B 10/07955; H04B 10/25
See application file for complete search history.

(56) References Cited

U.S. PATENT DOCUMENTS

| | | | |
|---|---|---|---|
| 2004/0190836 A1* | 9/2004 | Kilian | G02B 6/4214 385/92 |
| 2005/0110157 A1* | 5/2005 | Sherrer | G02B 6/4201 257/776 |
| 2010/0119192 A1* | 5/2010 | Fujikata | B82Y 20/00 385/14 |

* cited by examiner

*Primary Examiner* — Ryan Lepisto
(74) *Attorney, Agent, or Firm* — McAndrews, Held & Malloy (57) ABSTRACT

Methods and systems for optical power monitoring of a light source assembly coupled to a silicon photonically-enabled integrated circuit (chip) are disclosed and may include, in a system comprising an optical source assembly coupled to the chip: emitting a primary beam from a front facet of a laser in the optical source assembly and a secondary beam from a back facet of the laser, directing the primary beam to an optical coupler in the chip, directing the secondary beam to a surface-illuminated photodiode in the chip, and monitoring an output power of the laser utilizing an output signal from the photodiode. The primary beam may comprise an optical source for a photonics transceiver in the chip. The focused primary beam and the secondary beam may be directed to the chip using reflectors in a lid of the optical source assembly.

23 Claims, 4 Drawing Sheets

FIG. 2 ized integrated circuit, in accordance with an example embodiment of the disclosure.

METHOD AND SYSTEM FOR OPTICAL POWER MONITORING OF A LIGHT SOURCE ASSEMBLY COUPLED TO A SILICON PHOTONICALLY-ENABLED INTEGRATED CIRCUIT

CROSS-REFERENCE TO RELATED APPLICATIONS/INCORPORATION BY REFERENCE

This application is a continuation of application Ser. No. 14/612,416 filed on Feb. 3, 2015, which claims priority to and the benefit of U.S. Provisional Application 61/965,612 filed on Feb. 3, 2014, which is hereby incorporated herein by reference in its entirety.

FIELD

Certain embodiments of the disclosure relate to semiconductor photonics. More specifically, certain embodiments of the disclosure relate to a method and system for optical power monitoring of a light source assembly coupled to a silicon photonically-enabled integrated circuit.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for optical power monitoring of a light source assembly coupled to a silicon photonically-enabled integrated circuit, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for optical power monitoring of a light source assembly coupled to a silicon photonically-enabled integrated circuit. Exemplary aspects of the disclosure may comprise, in a system comprising an optical source assembly coupled to a photonically-enabled integrated circuit: emitting a primary beam from a front facet of a laser in the optical source assembly and a secondary beam from a back facet of the laser, directing the primary beam to an optical coupler in the photonically-enabled integrated circuit, directing the secondary beam to a surface-illuminated photodiode in the photonically-enabled integrated circuit, and monitoring an output power of the laser utilizing an output signal from the surface-illuminated photodiode. The primary beam may comprise an optical source for a photonics transceiver in the photonically-enabled integrated circuit. The photonically-enabled integrated circuit may comprise a silicon complementary metal-oxide semiconductor (CMOS) chip. The surface-illuminated photodiode may comprise a silicon, silicon-germanium, and/or germanium photodiode. The primary beam may be focused utilizing a ball lens. The focused primary beam may be directed to the optical coupler using a first reflector in a lid of the optical source assembly. The secondary beam may be directed to the surface-illuminated photodiode utilizing a second reflector in the lid of the optical source assembly. The optical coupler may comprise a grating coupler. The primary beam directed to the grating coupler may be coupled to a waveguide in the photonically-enabled integrated circuit. The coupled portion of the primary beam's output power may be monitored by tapping off a portion of the primary beam's already coupled power and directing it to a second photodiode.

Figure 1A:
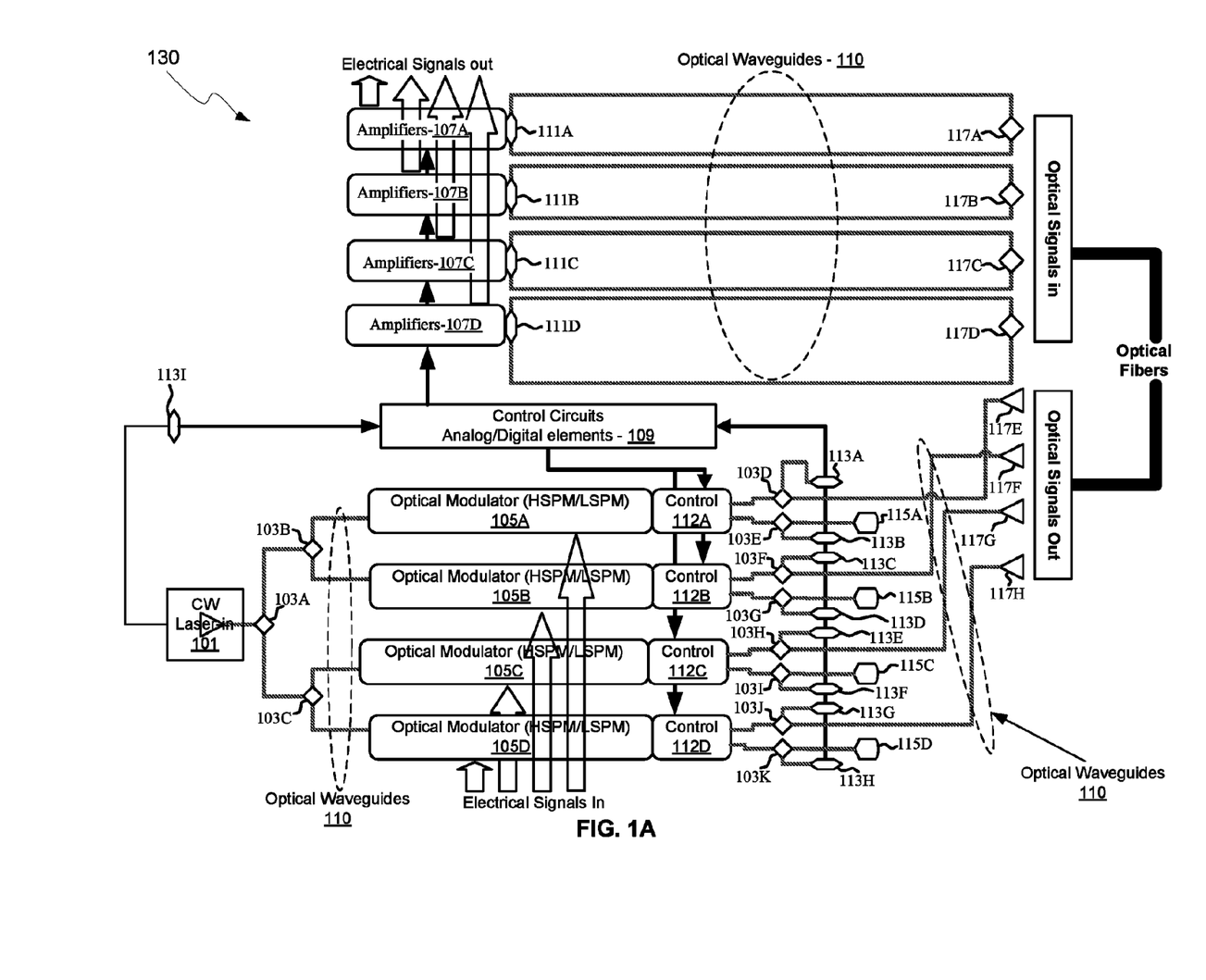
FIG. 1A is a block diagram of a photonically-enabled integrated circuit with optical power monitoring of a light source assembly, in accordance with an example embodiment of the disclosure.

FIG. 1A is a block diagram of a photonically-enabled integrated circuit with optical power monitoring of a light source assembly, in accordance with an example embodiment of the disclosure. Referring to FIG. 1A, there is shown optoelectronic devices on a photonically-enabled integrated circuit 130 comprising optical modulators 105A-105D, photodiodes 111A-111D, monitor photodiodes 113A-113H, surface-illuminated monitor photodiode 117I, and optical devices comprising couplers 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example. In an example scenario, the photonically-enabled integrated circuit 130 comprises a CMOS photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The outputs of the modulators 105A-105D may be optically coupled via the waveguides 110 to the grating couplers 117E-117H. The couplers 103A-103K may comprise four-port optical couplers, for example, and may be utilized to sample or split the optical signals generated by the optical modulators 105A-105D, with the sampled signals being measured by the monitor photodiodes 113A-113H. The unused branches of the directional couplers 103D-103K may be terminated by optical terminations 115A-115D to avoid back reflections of unwanted signals.

The grating couplers 117A-117H comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
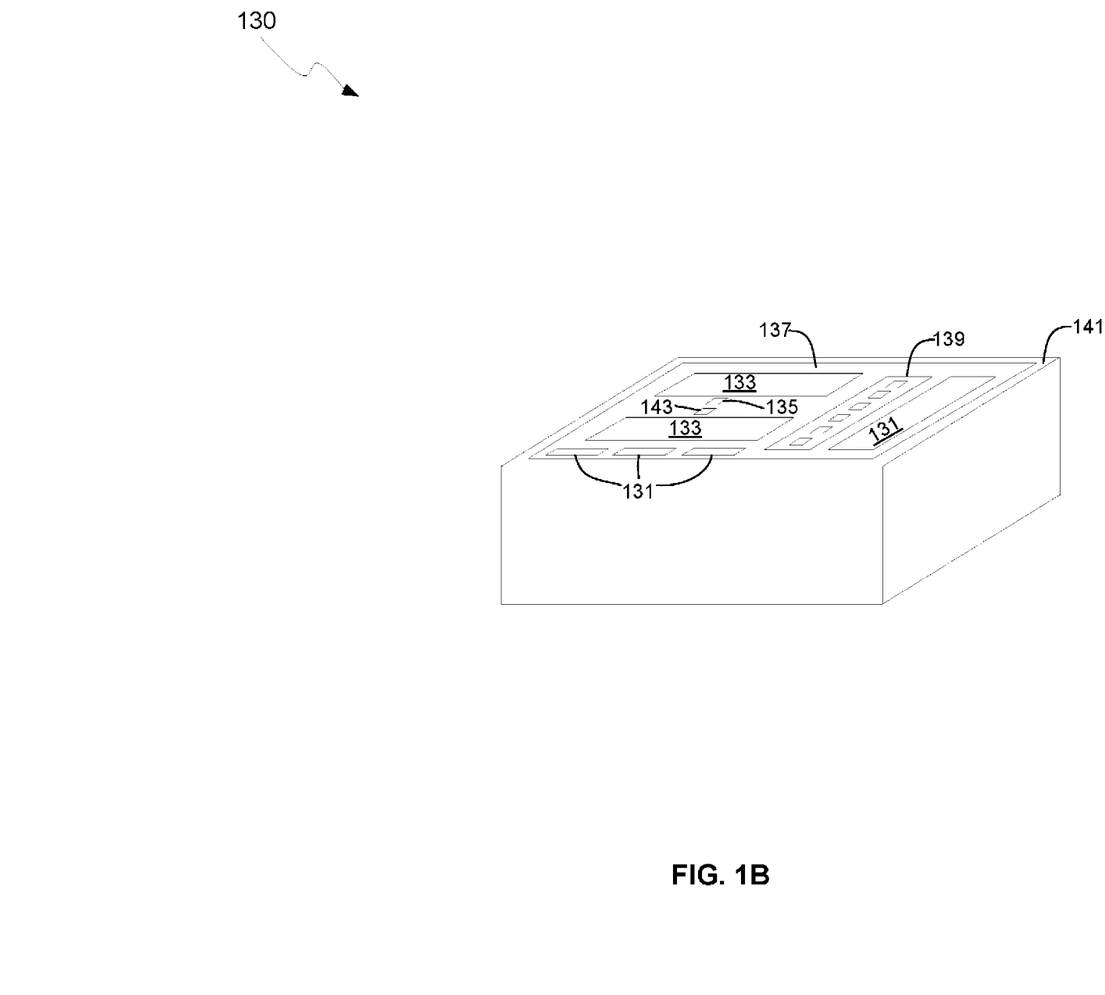
FIG. 1B is a diagram illustrating an exemplary photonically-enabled integrated circuit, in accordance with an exemplary embodiment of the disclosure.

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130. In addition, the optical signal from the back facet of the laser source 101 may be coupled directly to a top-side illuminated, or surface-illuminated monitor photodiode 113I, thereby providing a feedback signal for laser output control that is independent of the optical coupling efficiency of the primary beam (front facet) to the grating couplers 103A-103C.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 µm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

An integrated transceiver may comprise at least four optical interfaces, including a transmitter input port to interface to the CW light source, labeled as CW Laser In 101; a transmitter output port to interface to the fiber carrying the optical signal, labeled Optical Signals Out; a receiver input port to interface to the fiber carrying the optical signal, labeled Optical Signals In, and a back-facet monitoring top-illuminated photodiode 113I.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

It is often advantageous to have an external continuous-wave (CW) light source, because this architecture allows heat sinking and temperature control of the source separately from the transceiver chip 130. An external light source may also be connected to the transceiver chip 130 via a fiber interface. Alternatively, the light source can be integrated onto the integrated optics chip in a hybrid fashion where a separately packaged light source assembly is attached to the integrated optics chip.

Laser power and health monitoring is useful when deploying lasers diodes in many applications including optical communication. It is common practice to package laser diodes together with optical coupling elements for the primary (front-facet) beam and a separate secondary (back-facet) beam monitor photodiode in order to monitor the output power of the laser diode chip. The back-facet monitor-diode signal may be utilized to stabilize the output power of the laser and more generally to monitor the health of the laser diode. Additionally, when the back-facet power monitor is compared to the power monitored of the coupled primary-beam it may provide useful information on the health of the primary beams optical coupling path. However, the inclusion of a back-facet monitor diode increases both the size and the cost of such laser diode packages.

In optical communication systems employing silicon photonics, great emphasis is placed on the cost and size of transceivers and conventional transistor-outline. Butterfly-style and TO-can packaged laser diodes, which include back-facet monitors, are not readily used as light sources due to their excessive cost, size and, in the case of transistor outline package, inability to integrate an isolator. Furthermore, these conventional packages, which include power monitors, are also not easily or compactly coupled to and packaged with photonically-enabled integrated circuits, such as the chip 130. Although optical power monitoring of light-sources monolithically integrated in photonically-enabled integrated circuits would be possible, such light sources cannot readily be produced in silicon photonic circuits because the band gap of silicon is indirect, rendering it unsuitable for light generation. For the reasons described above, independent optical monitoring of the light source's output power in silicon photonics based systems is often forgone.

In an example scenario, a method is disclosed for monitoring the optical power produced by a laser-diode light-source assembly used in conjunction with a photonically-enabled integrated circuit. This may be accomplished by directing the secondary (back-facet) emission onto a surface-illuminated detector, such as the top-side illuminated monitor photodiode 113I, that is monolithically integrated into the photonically-enabled integrated circuit 130 while the laser's primary (front-facet) emission beam is coupled to the grating coupler 103A on the photonically-enabled integrated circuit 130. The signal from the surface-illuminated detector 113I may be used to monitor and control the power of the laser 101 and monitor the efficiency of the primary beam coupling over time.

FIG. 1B is a diagram illustrating an exemplary photonically-enabled integrated circuit, in accordance with an exemplary embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103K, optical terminations 115A-115D, grating couplers 117A-117H, optical modulators 105A-105D, high-speed heterojunction photodiodes 111A-111D, and monitor photodiodes 113A-113I.

In an example scenario, the surface-illuminated monitor photodiode 143 may comprise a silicon, silicon-germanium, or germanium photodiode that may be operable to receive optical signals from the back-facet (secondary) optical signal from a laser in a laser source assembly coupled to the chip surface 137. This may enable a grating-coupler-independent feedback path for controlling the output power of the laser.

Figure 1C:
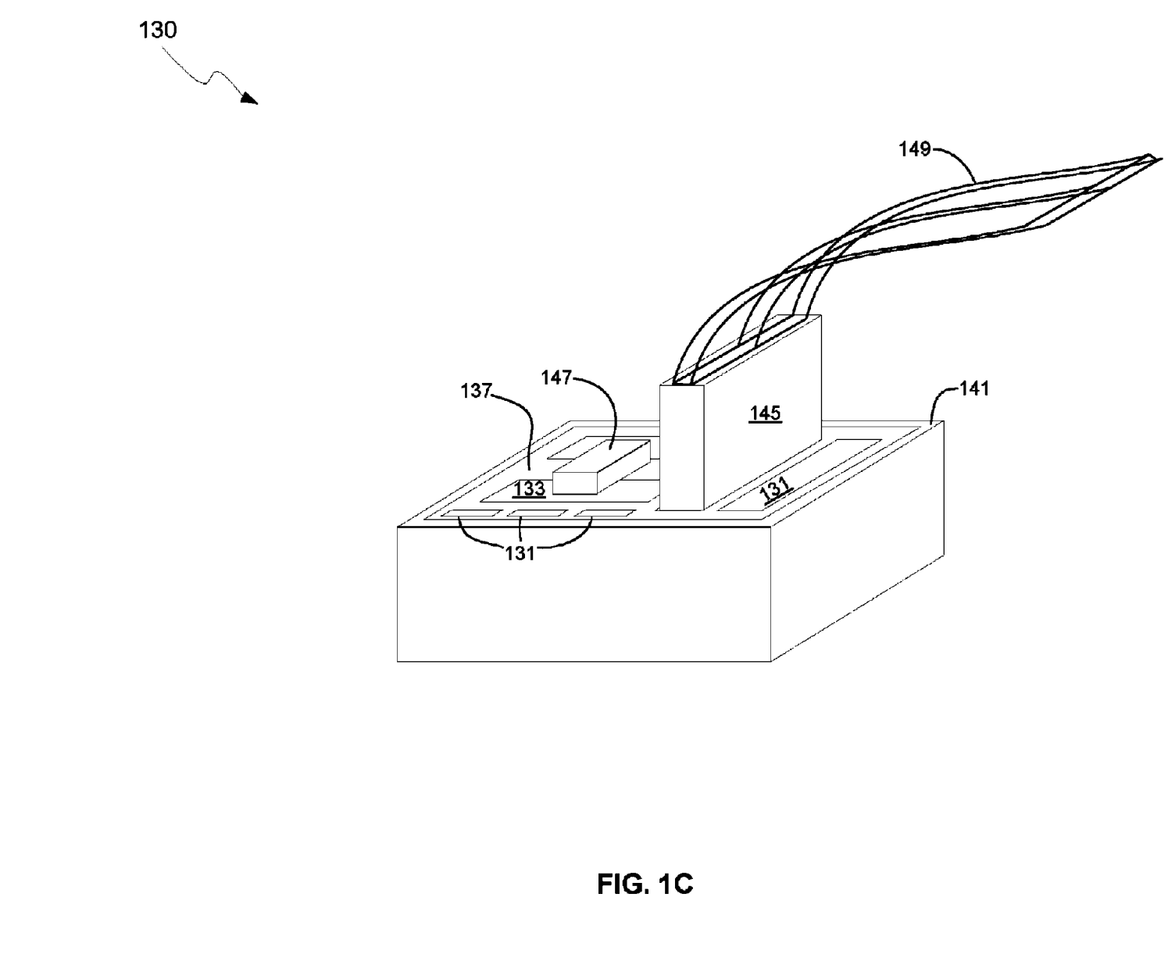
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There is also shown a fiber-to-chip coupler 145, an optical fiber cable 149, and an optical source assembly 147.

The photonically-enabled integrated circuit 130 comprising the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130.

Light sources for optically powering silicon-based photonically-enabled integrated circuits present a significant technical challenge in the commercialization of silicon photonics. Conventional laser light source packages, which often include a power monitoring function to monitor and control the laser's output power, are not suitable for use in silicon photonics. New methods and constraints for packaging lasers together with silicon photonic circuits require novel methods for integrating laser power monitors in silicon photonics based systems. In this disclosure, we describe a method for monitoring the power of a laser diode in the light source assembly 147 coupled to the silicon photonically-enabled integrated circuit 130

In an example scenario, the surface-illuminated monitor photodiode 143 may receive secondary optical signals from a laser in the light source assembly 147 thereby providing the ability to monitor the output power of the laser. The surface-illuminated monitor photodiode 143 may be large enough to make the measurement of the optical signal from the back facet (secondary signal) much less dependent on alignment of the light source assembly 147 to the light source interface 135.

Figure 2:
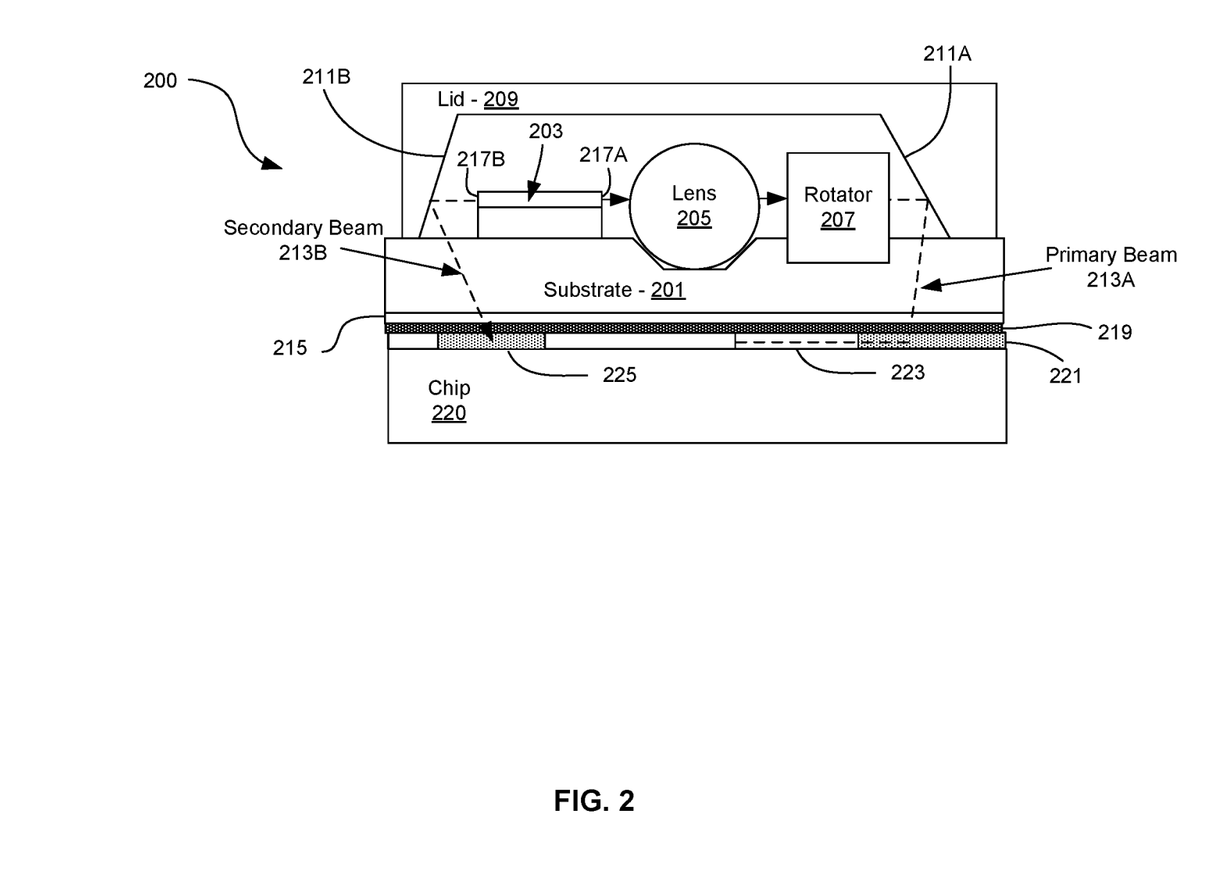
FIG. 2 illustrates a side view of a micro-packaged light source assembly coupled to a photonically enabled integrated circuit, in accordance with an example embodiment of the disclosure.

FIG. 2 illustrates a side view of a micro-packaged light source assembly coupled to a photonically enabled integrated circuit, in accordance with an example embodiment of the disclosure. Referring to FIG. 2, there is shown a light source assembly 200 and a photonically-enabled integrated circuit (chip) 220. The light source assembly 200 may comprise a package base or substrate 201, a laser diode 203, a ball lens 205, a rotator 207, a lid 209, mirrors or reflectors 211A and 211B, primary beam 213A, secondary beam 213B, a rotator stack 215, laser front facet 217A, and laser back facet 217B. The chip 220 may comprise an optical coupler 221, a waveguide 223, and a top-side illuminated photodiode 225.

The rotator 207 may comprise a Faraday rotator, and the optical coupler 221 may comprise a grating coupler, for example. In an example scenario, the package base 201 may comprise a silicon optical bench. The surface-illuminated photodiode 225 may comprise a silicon, silicon-germanium, or germanium photodiode, for example, although other materials may be utilized based on the wavelength of light generated by the laser 203 and the materials compatible with the photonically-enabled integrated circuit 220.

The primary (front-facet) emission beam 213A may be directed toward lens 205, through faraday rotator 207, and may proceed to the primary reflector 211A where it may be reflected downward through the package base 201, which may comprise a waveplate polarization rotator stack 215. The light source assembly 200 may be configured to focus the primary beam 213A on the optical coupler 221, which is coupled to waveguide 223, while matching the input mode field diameter of the optical coupler 221. Simultaneously or concurrently, the secondary (back-facet) emission beam 213B may be directed toward the secondary reflector 211B and reflected downward through package base 201 and onto a surface-illuminated detector 225 that is integrated in the photonically-enabled integrated circuit 220. In another example scenario, the primary reflector 211A and/or the secondary reflector 211B may comprise specular or diffuse reflectors to direct light onto the surface-illuminated photodiode 225. Accordingly, portions of either or both primary and secondary beams may be coupled to the surface-illuminated photodiode 225.

Since there is no lens element in the secondary beam's path, the secondary beam 213B expands as it proceeds along this path and the surface-illuminated detector 225 may readily be sized to sample the secondary beam 213B in a way that is not sensitive to the relative alignment of the light source assembly 200 to the surface-illuminated detector 225. In this way the output power of the light-source assembly 200 may be measured independent of the coupling of the primary beam 213A to the photonically-enabled integrated circuit 220.

In an example scenario, the laser light source assembly 200 is constructed in such a way as to direct both the primary (front-facet) beam 213A and secondary (back-facet) light signal 213B onto the photonically-enabled integrated circuit 220. The primary beam 213A may be coupled into the primary functional aspect of the photonic circuit as a source of optical power to enable the optical functions of the circuit while the secondary beam 213B may be directed to surface-illuminated detector 225 to monitor the output power of the laser 203 independent of the coupling of the primary beam to the photonically-integrated circuit 220.

To achieve the most efficient coupling of the laser's primary emission beam 213A to the photonically-enabled integrated circuit 220, the optical design of the light-source assembly 200 is generally such that the coupling is sensitive to the relative position of the light source and the photonically-enabled integrated circuit 220 for misalignments ranging from 1 to 20 microns. Simultaneously or concurrently, the secondary (back-facet) emission 213B, or portion thereof, is directed onto the surface-illuminated detector 225 in the photonically-enabled integrated circuit 220. The secondary emission beam 213B and the surface detector 225 are sized and aligned in such a way as to be insensitive to the relative movement of the light-source 203 and the photonically-enabled circuit for displacements as large as 100 microns. In this way the surface-illuminated detector signal may be utilized to monitor the output power of the laser diode 203 in the light-source assembly 200 independent of the primary beam 213A coupling to the photonically-enabled integrated circuit 220.

Additionally, it is readily possible to tap off a small portion of the waveguide-coupled primary beam 213A inside the photonic circuit in the photonically-enabled integrated circuit 220 and thereby monitor the power coupled into the photonic die 220. By comparing the waveguide-coupled power to the secondary-beam power as measured by the surface-illuminated detector 225, it is possible to monitor the health of the packaged assembly 200 and detect any relative movement of the light source's primary beam with respect to the photonic circuit. This feature can be a useful aid in manufacturing to track the performance and stability of various elements in the packaged assembly and can as provide real-time information about the health of assemblies under use conditions in the field.

In an example embodiment, a method and system are disclosed for optical power monitoring of a light source assembly coupled to a silicon photonically-enabled integrated circuit. In this regard, aspects of the disclosure may comprise a system comprising an optical source assembly coupled to a photonically-enabled integrated circuit, where the system is operable to emit a primary beam from a front facet of a laser in the optical source assembly and a secondary beam from a back facet of the laser, direct the primary beam to an optical coupler in the photonically-enabled integrated circuit, direct the secondary beam to a surface-illuminated photodiode in the photonically-enabled integrated circuit, and monitor an output power of the laser utilizing an output signal from the surface-illuminated photodiode.

The primary beam may comprise an optical source for a photonics transceiver in the photonically-enabled integrated circuit. The photonically-enabled integrated circuit may comprise a silicon complementary metal-oxide semiconductor (CMOS) chip. The surface-illuminated photodiode may comprise a germanium photodiode. The primary beam may be focused utilizing a ball lens. The focused primary beam may be directed to the optical coupler using a first reflector in a lid of the optical source assembly.

The secondary beam may be directed to the surface-illuminated photodiode utilizing a second reflector in the lid of the optical source assembly. A portion of the light from secondary and/or primary beam may also be directed toward to the surface illuminated photodiode using one or more non-specular reflector elements. A portion of the secondary and/or primary beam may be directed to the surface-illuminated photodiode using specular and/or diffuse reflectors. The optical coupler may comprise a grating coupler. The primary beam directed to the grating coupler may be coupled to a waveguide in the photonically-enabled integrated circuit. An output power of the primary beam may be monitored by tapping off a portion of the primary beam coupled to the waveguide to a second photodiode.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
in a system comprising an optical source assembly coupled to a photonically-enabled integrated circuit:
emitting a primary beam from a front facet of a laser in the optical source assembly and a secondary beam from a back facet of the laser;
directing the primary beam to an optical coupler in the photonically-enabled integrated circuit;
directing the secondary beam to a surface-illuminated photodiode in the photonically-enabled integrated circuit;
monitoring an output power of the laser utilizing an output signal from the surface-illuminated photodiode; and
monitoring a power coupled to the photonically-enabled circuit by tapping off a portion of the primary beam's already coupled power and directing through a waveguide to a second photodiode.

2. The method according to claim 1, wherein the primary beam is an optical source for a photonics transceiver in the photonically-enabled integrated circuit.

3. The method according to claim 1, wherein the photonically-enabled integrated circuit comprises a silicon complementary metal-oxide semiconductor (CMOS) chip.

4. The method according to claim 1, wherein the surface-illuminated photodiode comprises a silicon, silicon-germanium, or germanium photodiode.

5. The method according to claim 1, comprising focusing the primary beam utilizing a ball lens.

6. The method according to claim 5, comprising directing the focused primary beam to the optical coupler using a first reflector in a lid of the optical source assembly.

7. The method according to claim 6, comprising directing the secondary beam to the surface-illuminated photodiode utilizing a second reflector in the lid of the optical source assembly.

8. The method according to claim 6, comprising directing a portion of the secondary and/or primary beam to the surface-illuminated photodiode utilizing specular and/or diffuse reflectors.

9. A system for communication, the system comprising:
an optical source assembly coupled to a photonically-enabled integrated circuit, said system being operable to:
emit a primary beam from a front facet of a laser in the optical source assembly and a secondary beam from a back facet of the laser;
direct the primary beam to an optical coupler in the photonically-enabled integrated circuit;
direct the secondary beam to a surface-illuminated photodiode in the photonically-enabled integrated circuit;
monitor an output power of the laser utilizing an output signal from the surface-illuminated photodiode; and
monitoring of the power coupled to the photonically-enabled circuit by tapping off a portion of the primary beam's already coupled power and directing through a waveguide to a second photodiode.

10. The system according to claim 9, wherein the primary beam is an optical source for a photonics transceiver in the photonically-enabled integrated circuit.

11. The system according to claim 10, wherein the photonically-enabled integrated circuit comprises a silicon complementary metal-oxide semiconductor (CMOS) chip.

12. The system according to claim 9, wherein the surface-illuminated photodiode comprises a silicon, silicon-germanium or germanium photodiode.

13. The system according to claim 9, wherein the system is operable to focus the primary beam utilizing a ball lens.

14. The system according to claim 13, wherein the system is operable to direct the focused primary beam to the optical coupler using a first reflector in a lid of the optical source assembly.

15. The system according to claim 13, wherein the system is operable to direct a portion of the secondary and/or primary beam to the surface-illuminated photodiode using specular and/or diffuse reflectors.

16. The system according to claim 15, wherein the system is operable to direct the secondary beam to the surface-illuminated photodiode utilizing a second reflector in the lid of the optical source assembly.

17. A system for communication, the system comprising:
an optical source assembly coupled to a CMOS photonic chip, said system being operable to:
emit a primary beam from a front facet of a laser in the optical source assembly and a secondary beam from a back facet of the laser;
reflect the primary beam to a grating coupler in the CMOS photonic chip;
reflect the secondary beam to a surface-illuminated photodiode in the CMOS photonic chip;
monitor an output power of the laser utilizing an output signal from the surface-illuminated photodiode; and
monitoring of the power coupled to the photonically-enabled circuit by tapping off a portion of the primary beam's already coupled power and directing through a waveguide to a second photodiode.

18. The system according to claim 17, wherein the primary beam is an optical source for a photonics transceiver in the CMOS photonic chip.

19. The system according to claim 17, wherein the surface-illuminated photodiode comprises a silicon, silicon-germanium or germanium photodiode.

20. The system according to claim 17, wherein the system is operable to focus the primary beam utilizing a ball lens.

21. The system according to claim 17, wherein the system is operable to direct the focused primary beam to the optical coupler using a first reflector in a lid of the optical source assembly.

22. The system according to claim 17, wherein the system is operable to direct a portion of the secondary and/or primary beam to the surface-illuminated photodiode using specular and/or diffuse reflectors.

23. The system according to claim 17, wherein the system is operable to direct the secondary beam to the surface-illuminated photodiode utilizing a second reflector in the lid of the optical source assembly.

* * * * *

UNITED STATES PATENT AND TRADEMARK OFFICE
CERTIFICATE OF CORRECTION

PATENT NO. : 9,746,626 B2
APPLICATION NO. : 15/205400
DATED : August 29, 2017
INVENTOR(S) : Michael Mack, Subal Sahni and Steffen Gloeckner

It is certified that error appears in the above-identified patent and that said Letters Patent is hereby corrected as shown below:

In the Claims

Please add the word "integrated" to the last clause of Claim 1, at Column 9, Line 34 between the words "photonically-enabled" and "circuit"

Please add the word "integrated" to the last clause of Claim 9, at Column 10, Line 7 between the words "photonically-enabled" and "circuit"

Signed and Sealed this
Thirty-first Day of October, 2017

Joseph Matal
*Performing the Functions and Duties of the
Under Secretary of Commerce for Intellectual Property and
Director of the United States Patent and Trademark Office*